United States Patent
Mueller et al.

(10) Patent No.: US 9,475,414 B2
(45) Date of Patent: Oct. 25, 2016

(54) ADJUSTABLE HEAD RESTRAINT ASSEMBLY FOR VEHICLE SEATS

(71) Applicant: LEAR CORPORATION, Southfield, MI (US)

(72) Inventors: Karsten Mueller, Ingolstadt (DE); Frank Kunert, Ingolstadt (DE); Bernd Rolf Schwerma, Ginsheim-Gustavsburg (DE); Michael Menges, Pliening (DE); Klaus Lamecker, Oberding (DE)

(73) Assignee: Lear Corporation, Southfield, MI (US)

( * ) Notice: Subject to any disclaimer, the term of this patent is extended or adjusted under 35 U.S.C. 154(b) by 93 days.

(21) Appl. No.: 14/484,362

(22) Filed: Sep. 12, 2014

(65) Prior Publication Data

US 2015/0123445 A1    May 7, 2015

(30) Foreign Application Priority Data

Nov. 5, 2013   (DE) ........................ 10 2013 222 417

(51) Int. Cl.
  *B60N 2/48*     (2006.01)
(52) U.S. Cl.
  CPC ........... *B60N 2/4814* (2013.01); *B60N 2/4817* (2013.01); *B60N 2002/4894* (2013.01)
(58) Field of Classification Search
  CPC   B60N 2/4808; B60N 2/4814; B60N 2/4817; B60N 2/0228; B60N 2/4811
  USPC ........................................................ 297/410
  See application file for complete search history.

(56) References Cited

U.S. PATENT DOCUMENTS

| | | |
|---|---|---|
| 2,741,370 A | 4/1956 | Dills |
| 3,563,602 A | 2/1971 | Ohta et al. |
| 3,572,831 A | 3/1971 | Barecki et al. |
| 3,608,965 A | 9/1971 | Cziptschirsch |
| 4,671,573 A | 6/1987 | Nemoto et al. |
| 4,779,929 A | 10/1988 | Küchemann |
| 5,711,579 A | 1/1998 | Albrecht |

(Continued)

FOREIGN PATENT DOCUMENTS

| | | |
|---|---|---|
| CN | 1761591 A | 4/2006 |
| DE | 2426728 A1 | 12/1975 |

(Continued)

OTHER PUBLICATIONS

Chinese Office Action for corresponding Application No. 201410471530.4, mailed May 30, 2016, 9 pages.

*Primary Examiner* — Milton Nelson, Jr.

(74) *Attorney, Agent, or Firm* — Brooks Kushman P.C.

(57) ABSTRACT

A head restraint assembly is provided with a head restraint frame mounted to a post for movement along the post for adjustment relative to a vehicle seat. The head restraint frame has a contact surface. A biasing member is mounted to the head restraint frame for movement relative to the head restraint frame to maintain the head restraint frame in a locked condition along the post. An actuation member is mounted to the head restraint frame for movement relative to the head restraint frame. The actuation member cooperates with the biasing member such that movement of the actuation member moves the biasing member, thereby disengaging the biasing member from the post to permit movement of the head restraint along the post such that the biasing member engages the contact surface in the second position to provide feedback to the user of an unlocked condition of the head restraint frame.

20 Claims, 4 Drawing Sheets

(56) References Cited

U.S. PATENT DOCUMENTS

| | | | |
|---|---|---|---|
| 5,895,094 | A | 4/1999 | Mori et al. |
| 6,068,337 | A | 5/2000 | De Filippo |
| 6,361,113 | B2 | 3/2002 | Heilig |
| 6,880,891 | B2 | 4/2005 | Yetukuri et al. |
| 7,108,327 | B2 | 9/2006 | Locke et al. |
| 7,137,668 | B2 | 11/2006 | Kreitler |
| 7,306,287 | B2 | 12/2007 | Linardi et al. |
| 7,316,455 | B2 | 1/2008 | Metz et al. |
| 7,407,231 | B2 | 8/2008 | Kraft et al. |
| 7,562,936 | B1 | 7/2009 | Veine et al. |
| 7,621,598 | B2 * | 11/2009 | Humer ............. B60N 2/4814 297/216.12 |
| 7,758,127 | B2 | 7/2010 | Bokelmann et al. |
| 7,878,597 | B2 | 2/2011 | Bokelmann et al. |
| 8,376,465 | B2 | 2/2013 | Veine et al. |
| 2003/0020314 | A1 | 1/2003 | Mauro et al. |
| 2006/0087167 | A1 | 4/2006 | Kraft et al. |
| 2006/0186720 | A1 | 8/2006 | Linardi et al. |
| 2006/0250017 | A1 | 11/2006 | Otto et al. |
| 2006/0261661 | A1 | 11/2006 | Kraft et al. |
| 2008/0079294 | A1 | 4/2008 | Humer et al. |
| 2012/0080925 | A1 | 4/2012 | Steinmetz et al. |

FOREIGN PATENT DOCUMENTS

| | | |
|---|---|---|
| DE | 4222924 C1 | 9/1993 |
| DE | 19648321 A1 | 6/1997 |
| DE | 19603911 A1 | 8/1997 |
| DE | 19714283 A1 | 11/1997 |
| DE | 19630473 A1 | 1/1998 |
| DE | 19632560 A1 | 2/1998 |
| DE | 19714283 C2 | 2/2003 |
| DE | 10312517 A1 | 10/2004 |
| DE | 102005043811 A1 | 5/2006 |
| DE | 102005043811 B4 | 7/2007 |
| DE | 102007034961 A1 | 4/2008 |
| DE | 102009033425 A1 | 3/2010 |
| DE | 102011010232 A1 | 8/2012 |
| EP | 0267503 A2 | 5/1988 |
| EP | 0864461 A1 | 9/1998 |
| EP | 0916549 A1 | 5/1999 |
| EP | 0965481 A1 | 12/1999 |
| EP | 0965482 A1 | 12/1999 |
| EP | 0970846 A1 | 1/2000 |
| EP | 0916549 B1 | 1/2003 |
| EP | 0864461 B1 | 7/2009 |
| FR | 2537064 A1 | 6/1984 |
| FR | 2585647 A1 | 2/1987 |
| FR | 2585648 A1 | 2/1987 |
| FR | 2597813 A1 | 10/1987 |
| FR | 2771686 A1 | 6/1996 |
| FR | 2745245 A1 | 8/1997 |
| FR | 2758296 B1 | 3/1999 |
| FR | 2778879 A1 | 11/1999 |
| FR | 2787073 A1 | 6/2000 |
| FR | 2796822 A1 | 2/2001 |
| FR | 2826822 A1 | 10/2002 |
| FR | 2848931 A1 | 6/2004 |
| GB | 2240920 A | 8/1991 |
| IE | 3625691 A1 | 2/1988 |
| IT | 1256975 B | 12/1995 |
| IT | 1284668 B1 | 5/1998 |
| IT | 1291007 B1 | 12/1998 |
| JP | H01107709 A | 4/1989 |
| JP | 29152 U | 1/1990 |
| WO | 03059683 A1 | 7/2003 |

* cited by examiner

ADJUSTABLE HEAD RESTRAINT ASSEMBLY FOR VEHICLE SEATS

CROSS-REFERENCE TO RELATED APPLICATIONS

This application claims foreign priority benefits under 35 U.S.C. §119(a)-(d) to German Application 10 2013 222 417.6 filed Nov. 5, 2013 the disclosure of which is hereby incorporated by reference in its entirety.

TECHNICAL FIELD

Various embodiments relate to adjustable head restraint assemblies for vehicle seats.

BACKGROUND

An adjustable head restraint assembly is illustrated and described in Veine et al. U.S. Pat. No. 7,562,936 B1.

SUMMARY

According to one embodiment, a head restraint assembly is provided with a head restraint frame that is adapted to be mounted to at least one post for movement along the at least one post to permit adjustment of the head restraint relative to a vehicle seat. The head restraint frame has a contact surface. A biasing member is mounted to the head restraint frame for movement relative to the head restraint frame. The biasing member cooperates with the head restraint frame to maintain the head restraint frame in a locked condition along the at least one post. An actuation member is mounted to the head restraint frame for movement relative to the head restraint frame. The actuation member cooperates with the biasing member such that movement of the actuation member from a first position corresponding to the locked condition of the head restraint frame, to a second position corresponding to an unlocked condition of the head restraint frame, moves the biasing member, thereby disengaging the biasing member from the at least one post to permit movement of the head restraint frame along the at least one post such that the biasing member engages the contact surface in the second position to provide feedback to the user of the unlocked condition of the head restraint frame.

According to another embodiment, an adjustable head restraint assembly is provided with a head restraint frame that is adapted to be mounted to at least one post for movement along the at least one post to permit adjustment of the head restraint relative to a vehicle seat. The head restraint frame has a contact surface. A biasing member is mounted to the head restraint frame for movement relative to the head restraint frame. The biasing member cooperates with the head restraint frame to maintain the head restraint frame in a locked condition along the at least one post. An actuation member is mounted to the head restraint frame for movement relative to the head restraint frame. The actuation member cooperates with the biasing member such that movement of the actuation member from a first position corresponding to the locked condition of the head restraint frame to a second position corresponding to an unlocked condition of the head restraint frame, moves the biasing member, thereby disengaging the biasing member from the at least one post to permit movement of the head restraint frame along the at least one post such that the biasing member disengages the contact surface in the second position to provide feedback to the user of the unlocked condition of the head restraint frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
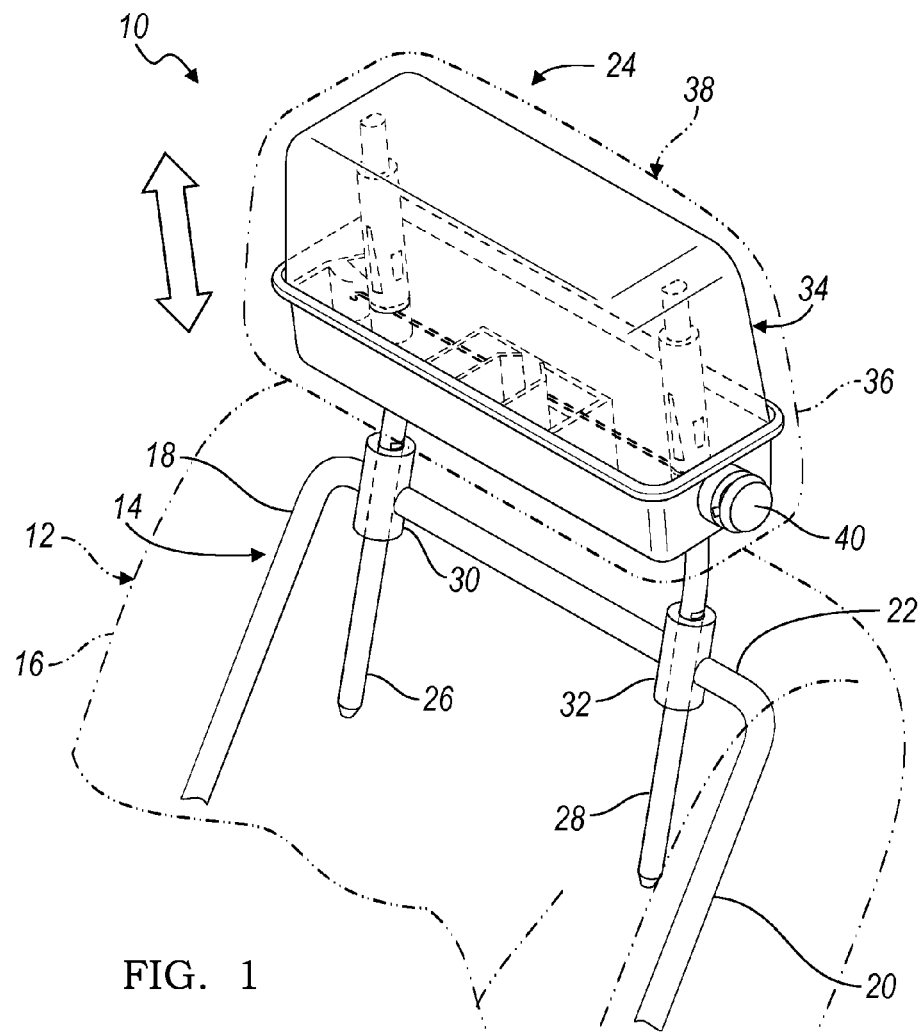
FIG. 1 is a fragmentary perspective view of an adjustable head restraint assembly according to an embodiment, illustrated mounted to a vehicle seat.

With reference now to FIG. 1, a vehicle seat is partially illustrated and referenced generally by numeral 10 for use in a vehicle, such as an automobile, a boat or an aircraft. The seat 10 includes a seat bottom (not shown) that is mounted within the vehicle. The seat 10 also includes a seat back 12 that is mounted to one of the seat bottom or the vehicle. The seat back 12 is illustrated with cushioning and a cover 16 in phantom for revealing a frame 14.

The vehicle seat 10 may be provided anywhere within an associated vehicle, such as a front row seat, an intermediate row seat, a rear row seat, or the like. The seat bottom may be mounted directly to the vehicle floor or coupled to seat adjuster mechanisms or rails extending longitudinally to the vehicle floor and enabling longitudinal, height, and angular adjustment of the seat bottom relative to the vehicle floor. The seat bottom is conventional in design and can be constructed in accordance with any suitable manner; including a structural frame covered by a foam pad layer and other finished cover material.

The frame 14 is formed from any suitable material that is sufficiently light in weight, yet structurally sound for supporting the occupant and for withstanding appropriate testing requirements. The frame 14 includes a pair of side members 18, 20, which are connected by an upper cross member 22. In the description, various embodiments and operating parameters and components of the embodiments are described with directional language such as "left", "right", "above", "below", "upper", "lower", and words of similar import to designate direction shown in the drawings or are understood in the field of the art. Such directional terminology is used for relative description and clarity, and is not intended to limit the orientation of any embodiment or component of an embodiment to a particular direction or orientation.

The frame members 18, 20, 22 can be formed integrally or from separate components that are joined by any suitable manner, such as welding, stamping, fastening or the like to form the frame 14. The frame 14 is subsequently covered with foam or cushioning and the cover material 16 to support the occupant.

A head restraint assembly 24 is provided in the vehicle proximate to the seat back 12 for supporting a head of the occupant. In the embodiment depicted, the head restraint assembly 24 includes a pair of posts 26, 28 that are secured to the frame 14. The posts 26, 28 may each be received in a corresponding sleeve 30, 32 that is mounted to the upper cross member 22 of the frame 14. The posts 26, 28 may be secured to the sleeve 30, 32, by a suitable fastener such as a retaining ring. Although the posts 26, 28 are illustrated mounted to the frame 14, the invention contemplates that the posts 26, 28 may be secured to any structure of the vehicle body for orienting the head restraint assembly 24 proximate to the seat back 12. For example, the head restraint assembly 24 may be secured to the seat back 12 for various seating arrangements such as front row seating, intermediate seating, and rear row seating. However, in certain seating arrangements the head restraint assembly 24 may be mounted directly to the vehicle body, such as a rear row seating that is adjacent to a cargo compartment, or single row seating vehicles. Alternatively, the pair of posts may be formed continuous from a unitary post that is bent to satisfy the geometries afforded by a discrete pair of posts; or from a weldment including a pair of posts and a cross member.

The head restraint assembly 24 includes a first frame portion 34 mounted to the posts 26, 28 for adjustment relative to the seat back 12. In the embodiment depicted, the adjustment is provided in an upright direction as illustrated by the linear arrow in FIG. 1, thereby providing a height adjustment of the first frame portion 34 relative to the seat back 12. Alternatively, the adjustment could be utilized in another direction, such as a fore/aft direction within the vehicle by extending the posts 26, 28 in a fore/aft direction. A second frame portion may be provided for engagement with the first frame portion 34 and for enclosing the first frame portion 34. Cushioning or foam padding is provided about the first frame portion 34 with a trim cover 36 enclosing the head restraint assembly 24. The first frame portion 34, padding and cover 36 provide a head restraint 38 that is adjustable relative to the posts 26, 28.

In at least one embodiment, a push button 40 is provided on a lateral side of the first frame portion 34 for cooperating with a locking mechanism for securing the first frame portion 34 and consequently the head restraint 38 to multiple positions along the posts 26, 28. The push button 40 extends external of the trim cover 36 for actuation by the user. Alternatively, the push button 40 may be retained within the trim cover 36, and a designation of the location of the push button 40 may be provided externally on the trim cover 36. As yet another alternative, the posts 26, 28 may be moveable relative to the seat back frame 14, and the locking mechanism may be provided on the seat back frame 14 for adjusting the posts 26, 28 and the head restraint 38 relative to the seat back frame 14.

Figure 2:
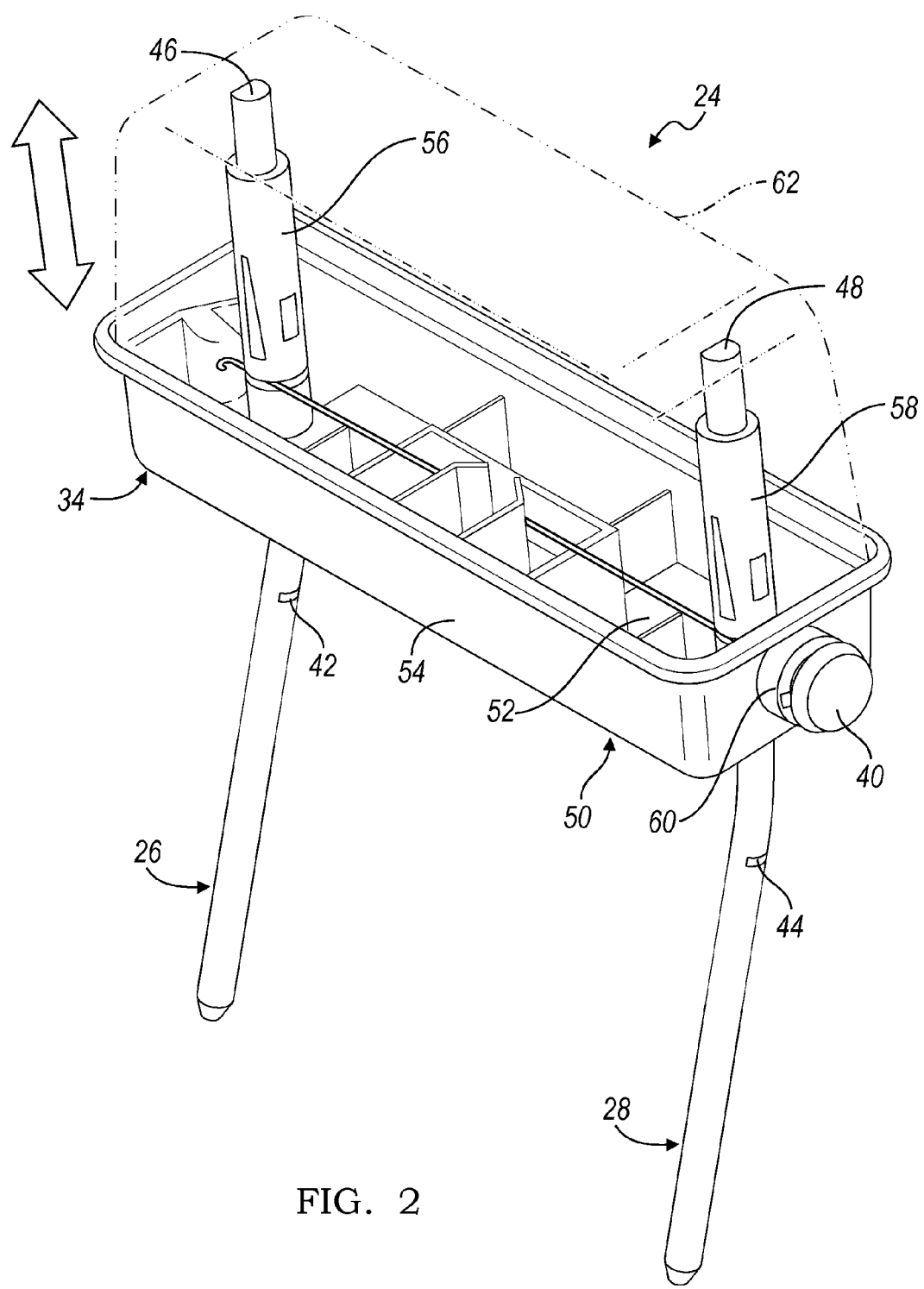
FIG. 2 is an enlarged fragmentary perspective view of the adjustable head restraint assembly of FIG. 1.

Referring now to FIG. 2, the adjustable head restraint assembly 24 is illustrated in greater detail. Each of the posts 26, 28 is illustrated with a notch 42, 44 for cooperating with a fastener, such as a retaining ring for securing the posts 26, 28 to the frame 14. Each of the posts 26, 28 includes a generally upright portion 46, 48. The head restraint first frame portion 34 is mounted to the upright portions 46, 48 of the posts 26, 28 for movement along the upright portions 46, 48 for adjustment of the head restraint 38 relative to the posts 26, 28.

The head restraint first frame portion 34 provides a base 52. A pair of sleeves 56, 58 is provided by the base 52, each for receiving one of the upright portions 46, 48 of one of the posts 26, 28. The first frame portion 34 is formed integrally from a material having adequate structural characteristics, yet being light in weight, as a high strength polymer, such as high density polyethylene (HDPE) or any suitable material, such as a material which may be formed by injection molding. The first frame portion 34 also includes a transverse guide 60, which receives the push button 40 and permits translation of the push button 40 relative to the first frame portion 34.

The head restraint assembly 24 also includes a cover 62 that cooperates with the sidewalls 54 of the lower housing portion 50 for enclosing the upright portions 46, 48 of the posts 26, 28 and the sleeves 56, 58 of the lower housing portion 50. The cover 62 also encloses the locking mechanism therein, which permits the adjustment of the head restraint 38. The cover 62 may also be formed from a high strength polymer such as HDPE, and may be injection molded with a series of structural ribs therein for providing added structural support to the first frame portion 34. The cover 62 may be formed as one component as depicted, or alternatively as multiple components, such as a pair of shell halves for mating to enclose the upright portions 46, 48 of the posts 26, 28, while also mating with the lower housing portion 50. Foam padding is subsequently provided about the frame portions 34, 62 for providing comfort to the occupant. The trim cover 36 is provided about the foam padding for enclosing the padding, and the first frame portion 34.

Referring now to FIGS. 3-11, a locking mechanism 64 includes a single spring wire 66 that extends laterally within a cavity of the first frame portion 34. The spring wire 66 has a first end 68 at one lateral end of the first frame portion 34, and a second end 70 that extends to the other lateral end of the first frame portion 34. Each of the sleeves 56, 58 includes a recess 72, 74 formed therein for providing access to the corresponding upright portion of the posts. In the locked position, the spring wire 66 extends into recesses 72, 74 thereby engaging the upright portions 46, 48 of the posts 26, 28 and locking the head restraint 38 to an adjusted position upon the upright portions 46, 48 of the posts 26, 28.

Figure 4:
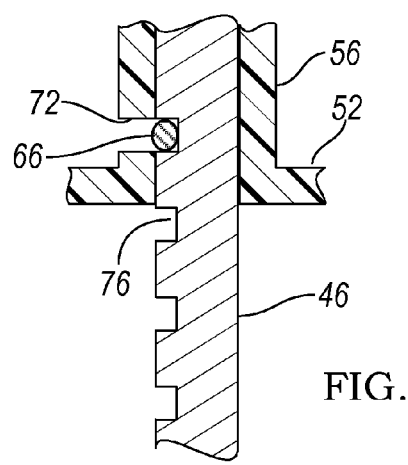
FIG. 4 is a partial section view of a portion of the locking mechanism of FIG. 3.

As illustrated in FIG. 4, each upright portion 46, 48 of the posts 26, 28 may include a series of incremental notches 76 formed therein and aligned with the recess 72, 74 so that the spring wire 66 may extend into the notches 76 at each incremental height position for securely locking the head restraint 38 at the desired position.

Referring again to FIGS. 3-11, the push button 40 extends through a sidewall 54 of the first frame portion 34 and engages the second end 70 of the spring wire 66. Actuation of the push button 40 by introduction of an external force, consequently actuates the spring wire 66 thereby disengaging the spring wire 66 from the upright portions 46, 48 of the posts 26, 28 for unlocking the head restraint 38 and for adjusting the height of the head restraint 38.

Figure 3:
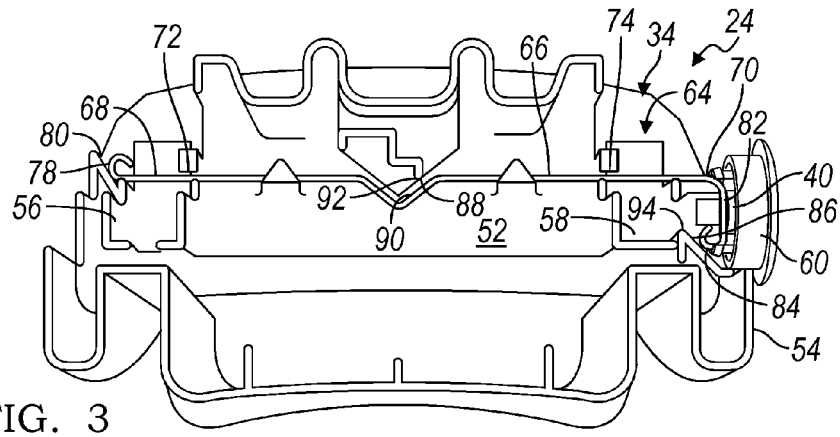
FIG. 3 is a top perspective view of the adjustable head restraint assembly of FIG. 1, illustrated with an upper housing portion removed therefrom, illustrating a locking mechanism in a locked position.
Figure 5:
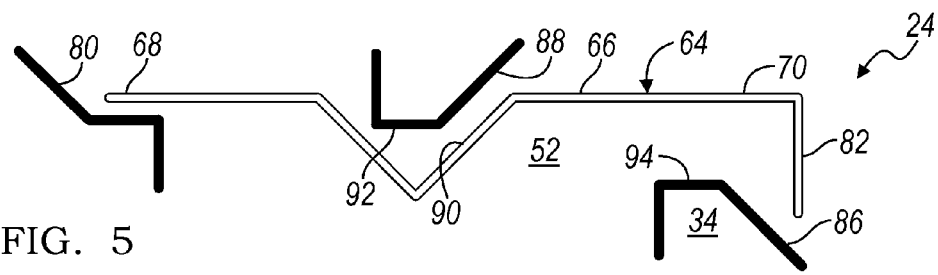
FIG. 5 is a top plan schematic view of the locking mechanism of FIG. 3, illustrated in a locked position.
Figure 6:
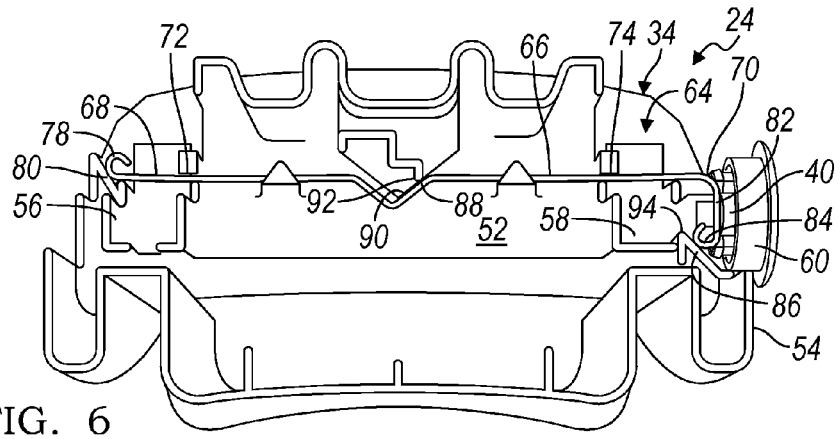
FIG. 6 is a top perspective view of the adjustable head restraint assembly of FIG. 3, illustrated in an intermediate position.

Referring now to FIGS. 3 and 5, the locking mechanism 64 is illustrated in the locked position. The first end 68 of the spring wire 66 includes a leading surface 78 formed by a curve in the spring wire 66. The first frame portion 34 includes a first ramp 80 that is oriented within the path of travel of the leading surface 78 of the spring wire first end 68. Upon actuation of the push button 40 and consequently the spring wire 66, the leading surface 78 engages the ramp 80, thereby causing the spring wire 66 to flex as the first end 68 is urged away, and out of engagement with the upright portion 46 of the post 26.

The second end 70 of the spring wire 66 includes a transverse portion 82 that engages the push button 40. Thus, actuation of the push button 40 actuates the transverse portion 82 of the spring wire 66. A leading surface 84 is provided on the transverse portion 82. A second ramp 86 is provided within the first frame portion 34 within the path of movement of the leading surface 84 of the transverse portion 82. Thus, as the push button 40 and the transverse portion 82 of the spring wire 66 are translated to an unlocked position, the leading surface 84 of the transverse portion 82 engages the second ramp 86 thereby urging the spring wire 66 away from and out of engagement with the upright portion 48 of the post 28.

Figure 7:
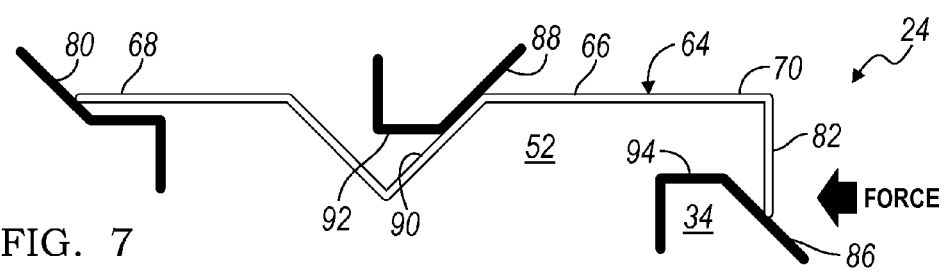
FIG. 7 is a top plan schematic view of the locking mechanism of FIG. 3, illustrated in the intermediate position.
Figure 8:
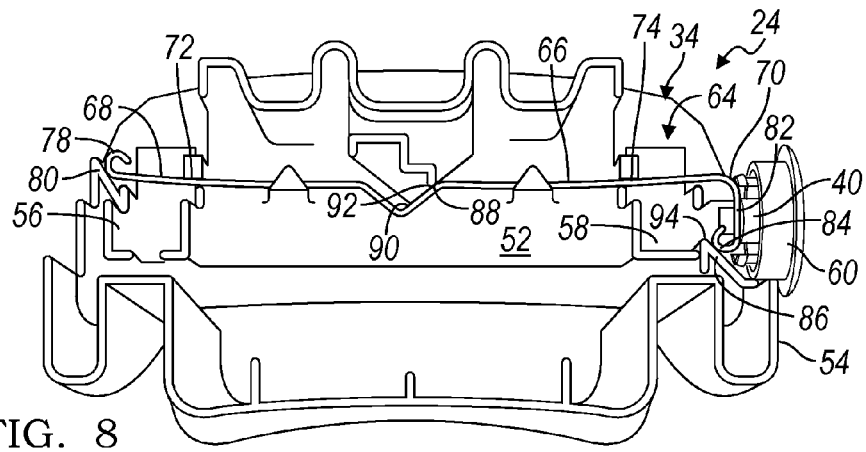
FIG. 8 is a top perspective view of the adjustable head restraint assembly of FIG. 3, illustrated in another intermediate position.
Figure 9:
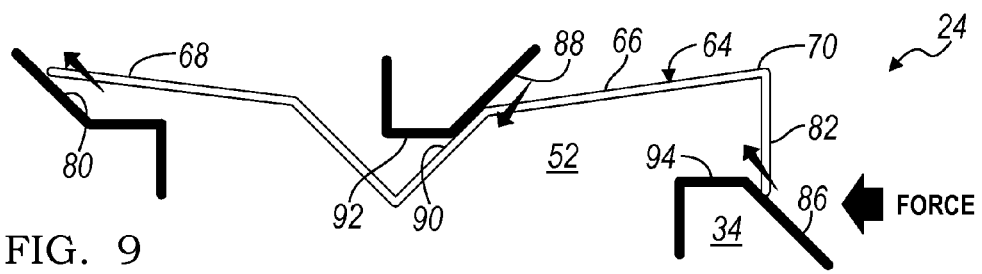
FIG. 9 is a top plan schematic view of the locking mechanism of FIG. 3, illustrated in the intermediate position of FIG. 8.
Figure 10:
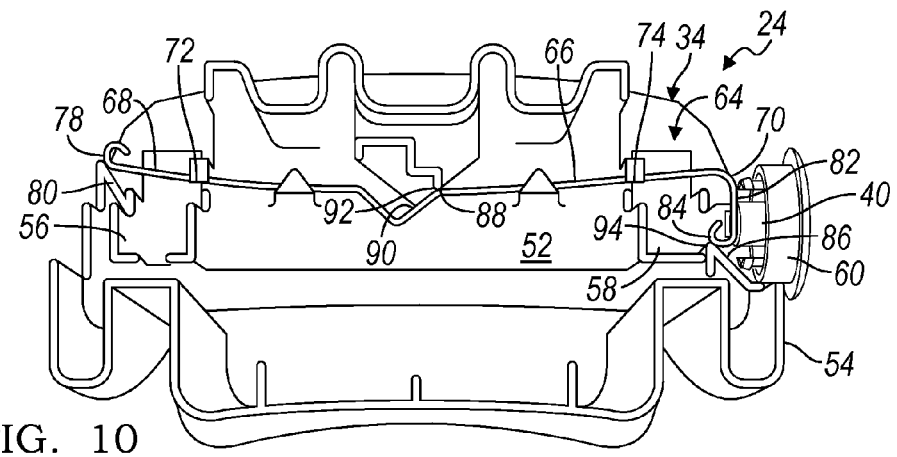
FIG. 10 is a top perspective view of the adjustable head restraint assembly of FIG. 3, illustrated in an unlocked position.
Figure 11:
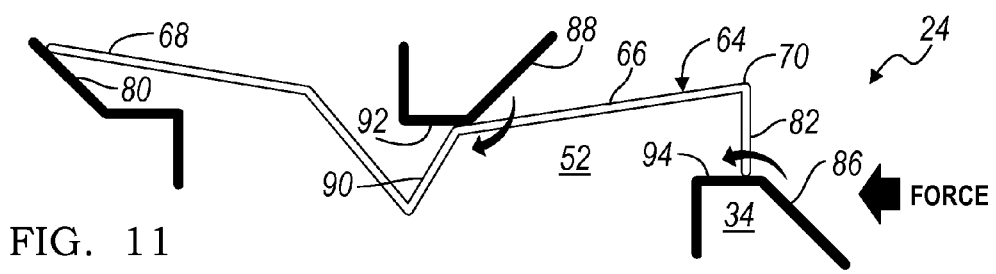
FIG. 11 is a top plan schematic view of the locking mechanism of FIG. 3, illustrated in the unlocked position.

Actuation of the push button 40 in a linear inboard direction as indicated by the arrows in FIGS. 7, 9 and 11 translates the push button 40 from the locked position of FIGS. 3-5, to the intermediate positions of FIGS. 6-9, to an unlocked position illustrated in FIGS. 10 and 11. In the unlocked position, the leading surface 78 of the spring wire first end 68 has engaged the first ramp 80 and thereby urges the spring wire 66 out of engagement, and consequently out of the notch 76 of the upright portion 46 of the post 26. Likewise, the leading surface 84 of the transverse portion 82 of the second end 70 of the spring wire 66 has engaged the second ramp 86 thereby urging the spring wire 66 out of engagement with the upright portion 48 of the post 28. In this unlocked position, the spring wire 66 is no longer engaging the upright portions 46, 48 of the posts 26, 28 and therefore the spring wire 66 is disengaged from the corresponding notches 76 thereby permitting the user to adjust the height of the head restraint 38.

The first frame portion 34 is also provided with a third ramp 88 oriented centrally within the first frame portion 34 between the spaced apart posts 26, 28. The spring wire 66 includes a corresponding leading surface 90 formed in an intermediate region of the spring wire 66. As the spring wire 66 is translated from the locked positions of FIGS. 3-5 to the intermediate positions of FIGS. 6-9, the intermediate leading surface 90 of the spring wire maintains engagement with the third ramp 88. An additional contact surface 92 is provided adjacent the third ramp 88. As the spring wire 66 reaches the unlocked position of FIGS. 10 and 11, the spring wire 66 engages the contact surface 92, thereby disengaging the intermediate leading surface 90 from the third ramp 88. As the spring wire 66 reaches the unlocked position of FIGS. 10 and 11, the engagement of the spring wire 66 upon the contact surface 92, provides a tactile pressure point, which may be felt by the user during actuation of the push button 40. As the spring wire 66 reaches the unlocked position of FIGS. 10 and 11, the engagement of the spring wire 66 upon the contact surface 92, also provides an audible pressure point, which generates a "snap" or "click" that may be heard by the user. The tactile and audible pressure point provides feedback to the user indicating to the user that the locking mechanism 64 is in the unlocked position.

An additional contact surface 94 is provided adjacent the second ramp 86. As the spring wire 66 reaches the unlocked position of FIGS. 10 and 11, the leading surface 84 engages the contact surface 94, thereby disengaging the leading surface 84 from the second ramp 86. As the spring wire 66 reaches the unlocked position of FIGS. 10 and 11, the engagement of the leading surface 84 upon the contact surface 94, provides a tactile pressure point, which may be felt by the user during actuation of the push button 40. As the spring wire 66 reaches the unlocked position of FIGS. 10 and 11, the engagement of the leading surface 84 upon the contact surface 94, also provides an audible pressure point, which generates a "snap" or "click" that may be heard by the user. The tactile and audible pressure point provides feedback to the user indicating to the user that the locking mechanism 64 is in the unlocked position.

Since the spring wire 66 is bent in the unlocked position of FIGS. 10 and 11, the spring wire 66 provides a resultant return force upon the ramp 80. Upon removal of an external force upon the push button 40, the spring wire 66 expands lengthwise thereby providing the return force against the ramps 80, 86, 88 for returning the spring wire 66 to the locked position of FIGS. 3-5, and consequently returning the push button 40 to the locked position. As the leading surface 90 reengages the third ramp 88, and the leading surface 84 reengages the second ramp 86, audible feedback of reengagement may also be detected.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A head restraint assembly comprising:
   a head restraint frame adapted to be mounted to at least one post for movement along the at least one post to permit adjustment of the head restraint frame relative to a vehicle seat, the head restraint frame having a contact surface;
   a biasing member mounted to the head restraint frame for movement relative to the head restraint frame, the biasing member cooperating with the head restraint frame to maintain the head restraint frame in a locked condition along the at least one post; and
   an actuation member mounted to the head restraint frame for movement relative to the head restraint frame, the actuation member cooperating with the biasing member such that movement of the actuation member from a first position corresponding to the locked condition of the head restraint frame to a second position corresponding to an unlocked condition of the head restraint frame, moves the biasing member, thereby disengaging the biasing member from the at least one post to permit movement of the head restraint frame along the at least one post such that the biasing member engages the contact surface in the second position to provide feedback to a user of the unlocked condition of the head restraint frame; and wherein the engagement of the biasing member upon the contact surface provides an audible pressure point, for audible detection by the user during manual actuation of the actuation member.

2. The head restraint assembly of claim 1 wherein the engagement of the biasing member upon the contact surface provides a tactile pressure point, for manual detection by the user during manual actuation of the actuation member.

3. The head restraint assembly of claim 1 further comprising at least one post adapted to be secured to a vehicle proximate to the vehicle seat, wherein the head restraint frame is mounted to the at least one post for adjustment along the at least one post.

4. A vehicle seat assembly comprising:
a seat bottom adapted to be mounted to a vehicle;
a seat back adapted to be mounted to the vehicle adjacent to the seat bottom; and
the head restraint assembly of claim 3, wherein the at least one post is mounted to the vehicle proximate to the seat back.

5. The head restraint assembly of claim 1 further comprising a ramp fixed to the head restraint frame within a path of movement of the biasing member such that movement of the actuation member from the first position to the second position urges the biasing member into engagement with the ramp and consequently out of engagement with the at least one post to permit movement of the head restraint frame along the at least one post.

6. The head restraint assembly of claim 5 wherein the ramp is oriented adjacent a proximal end of the biasing member relative to the actuation member.

7. The head restraint assembly of claim 5 wherein upon removal of an external force upon the actuation member, the biasing member expands thereby disengaging the ramp to provide feedback to the user of a locked condition of the head restraint frame.

8. The head restraint assembly of claim 5 wherein the contact surface is oriented adjacent to the ramp.

9. The head restraint assembly of claim 5 wherein the ramp is oriented centrally within the head restraint frame.

10. The head restraint assembly of claim 9 wherein the head restraint frame comprises a second ramp oriented adjacent a proximal end of the biasing member relative to the actuation member and a second contact surface adjacent the second ramp such that movement of the actuation member from the first position to the second position moves the biasing member from engagement of the proximal end of the biasing member with the second ramp to engagement of the proximal end of the biasing member to the second contact surface to provide additional feedback to the user of the unlocked condition of the head restraint frame.

11. An adjustable head restraint assembly comprising:
a head restraint frame adapted to be mounted to at least one post for movement along the at least one post to permit adjustment of the head restraint frame relative to a vehicle seat, the head restraint frame having a contact surface;
a biasing member mounted to the head restraint frame for movement relative to the head restraint frame, the biasing member cooperating with the head restraint frame to maintain the head restraint frame in a locked condition along the at least one post; and
an actuation member mounted to the head restraint frame for movement relative to the head restraint frame, the actuation member cooperating with the biasing member such that movement of the actuation member from a first position corresponding to the locked condition of the head restraint frame to a second position corresponding to an unlocked condition of the head restraint frame, moves the biasing member, thereby disengaging the biasing member from the at least one post to permit movement of the head restraint frame along the at least one post such that the biasing member disengages the contact surface in the second position to provide feedback to a user of the unlocked condition of the head restraint frame;

wherein the contact surface is further defined as a ramp fixed to the head restraint frame within a path of movement of the biasing member such that movement of the actuation member from the first position to the second position urges the biasing member into engagement with the ramp and consequently out of engagement with the at least one post to permit movement of the head restraint frame along the at least one post; and wherein the head restraint frame comprises a second contact surface adjacent the ramp, such that the biasing member engages the second contact surface after disengagement from the ramp.

12. The head restraint assembly of claim 11 wherein the engagement of the biasing member upon the second contact surface provides an audible pressure point, for audible detection by the user during manual actuation of the actuation member.

13. The head restraint assembly of claim 11 wherein the engagement of the biasing member upon the second contact surface provides a tactile pressure point, for manual detection by the user during manual actuation of the actuation member.

14. The head restraint assembly of claim 11 wherein the feedback is audible.

15. The head restraint assembly of claim 11 wherein the feedback is tactile.

16. A head restraint assembly comprising:
a head restraint frame adapted to be mounted to at least one post for movement along the at least one post to permit adjustment of the head restraint frame relative to a vehicle seat, the head restraint frame having a first contact surface;
a biasing member mounted to the head restraint frame for movement relative to the head restraint frame, the biasing member cooperating with the head restraint frame to maintain the head restraint frame in a locked condition along the at least one post;
an actuation member mounted to the head restraint frame for movement relative to the head restraint frame, the actuation member cooperating with the biasing member such that movement of the actuation member from a first position corresponding to the locked condition of the head restraint frame to a second position corresponding to an unlocked condition of the head restraint frame, moves the biasing member, thereby disengaging the biasing member from the at least one post to permit movement of the head restraint frame along the at least one post such that the biasing member engages the first contact surface in the second position to provide a first feedback to a user of the unlocked condition of the head restraint frame; and
a ramp fixed to the head restraint frame within a path of movement of the biasing member such that movement of the actuation member from the first position to the second position urges the biasing member into engagement with the ramp and consequently out of engagement with the at least one post to permit movement of the head restraint frame along the at least one post; and
wherein the head restraint frame comprises a second ramp oriented adjacent a proximal end of the biasing member relative to the actuation member and a second contact surface adjacent the second ramp such that movement of the actuation member from the first position to the second position moves the biasing member from engagement of the proximal end of the biasing member with the second ramp to engagement of the proximal end of the biasing member to the second contact surface to provide a second feedback to the user of the unlocked condition of the head restraint frame.

17. The head restraint assembly of claim 16 wherein the first feedback and the second feedback are tactile.

18. The head restraint assembly of claim 16 wherein the first feedback and the second feedback are audible.

19. The head restraint assembly of claim 16 wherein the engagement of the biasing member upon the first contact surface provides a tactile pressure point, for manual detection by the user during manual actuation of the actuation member.

20. The head restraint assembly of claim 16 wherein the engagement of the biasing member upon the first contact surface provides an audible pressure point, for audible detection by the user during manual actuation of the actuation member.

* * * * *